United States Patent
Yoshida et al.

(10) Patent No.: US 6,361,454 B1
(45) Date of Patent: Mar. 26, 2002

(54) MULTI-PIECE GOLF BALL

(75) Inventors: Kazunari Yoshida; Keiji Moriyama, both of Akashi (JP)

(73) Assignee: Sumitomo Rubber Industries, Ltd., Kyogo-ken (JP)

( * ) Notice: Subject to any disclaimer, the term of this patent is extended or adjusted under 35 U.S.C. 154(b) by 0 days.

(21) Appl. No.: 09/420,558

(22) Filed: Oct. 19, 1999

(30) Foreign Application Priority Data

Nov. 13, 1998 (JP) ............................................ 10-323601

(51) Int. Cl.⁷ ................................................ A63B 37/06
(52) U.S. Cl. ........................................ 473/376; 473/374
(58) Field of Search ................................. 473/367, 370, 473/371, 373, 374, 376, 377

(56) References Cited

U.S. PATENT DOCUMENTS

| | | | |
|---|---|---|---|
| 5,688,595 A | * 11/1997 | Yamagishi et al. | 473/375 |
| 5,733,205 A | * 3/1998 | Higuchi et al. | 473/376 |
| 5,779,562 A | * 7/1998 | Melvin et al. | 473/373 |
| 6,056,650 A | * 5/2000 | Yamagishi et al. | 473/384 |
| 6,117,026 A | * 9/2000 | Hayashi et al. | 473/374 |

OTHER PUBLICATIONS

Patent Abstracts of Japan, 08 336617, Dec. 24, 1996, Yamagishi Hisashi et al.

Patent Abstracts of Japan, 08 336618, Dec. 24, 1996, Higuchi Hiroshi et al.

Patent Abstracts of Japan, 09 056848, Mar. 4, 1997, Higuchi Hiroshi et al.

Patent Abstracts of Japan, 09 248351, Sep. 22, 1997, Shimozaka Hirotaka et al.

Patent Abstracts of Japan, 09 266959, Oct. 14, 1997, Osumi Shunji et al.

Patent Abstracts of Japan, 09 299510, Nov. 25, 1997, Hayashi Junji et al.

* cited by examiner

*Primary Examiner*—Mark S. Graham
*Assistant Examiner*—Raeann Gordon
(74) *Attorney, Agent, or Firm*—Birch, Stewart, Kolasch & Birch, LLP

(57) ABSTRACT

A Golf ball retaining high coefficient of restitution inherent in solid golf balls and having excellent shot feeling is disclosed. A multi-piece golf ball comprising: an inner core which is positioned in a central part of the golf ball, and has a JIS-C hardness of 75 or smaller; an outer core which encloses the inner core; an outer cover which is positioned in a surface part of the golf ball; and an inner cover which is placed on the inside of the outer cover, and has a JIS-C hardness of 80 or larger, wherein a JIS-C hardness of the outer core is smaller than that of the other components, and a JIS-C hardness of the outer cover is larger than that of the other components.

13 Claims, 1 Drawing Sheet

US 6,361,454 B1

MULTI-PIECE GOLF BALL

BACKGROUND OF THE INVENTION

1. Field of the Invention

The present invention relates to a multi-piece golf ball excellent in flight performance and shot feeling. More particularly it relates to a multi-piece golf ball having an improved shot feeling while retaining a low spin and high trajectory angle inherent in two-piece golf balls.

2. Description of the Prior Art

Hitherto, there have been used thread-wound golf balls and two-piece golf balls. The former is obtained by winding a rubber thread around a center filled with a solid or liquid and then covering the rubber-thread wound center with a cover mainly made of balata or synthetic resin. The latter is obtained by covering a rubber core with a cover made of a synthetic resin such as ionomer.

Thread-wound golf balls provides a good shot feeling because players receive small impact when hitting the ball and has a good controllability because players can impart intentional spin on the golf ball. However, since thread-wound golf balls are liable to spin, a sufficient flying distance cannot be secured in a wind ahead. In addition, they are poor in durability. As compared with thread-wound golf balls, two-piece golf balls have superior durability and can ensure a lower flying distance in a wind ahead because they are not susceptible to spin and have a relatively high coefficient of restitution. The high coefficient of restitution of the two-piece golf ball is resulting from the hard core, namely the core made from a hard material such as ionomor. However the hard core of the two-piece golf ball contributes to giving players a bigger impact than the thread-wound golf ball when hitting, which means inferior shot feeling to the thread-wound golf balls.

Japanese Patent Laid-Open Nos. 336617/1996, 336618/1996, 56848/1997, 248351/1997, 266959/1997 and 299510/1997 propose multi-piece golf balls which have improved shot feeling while ensuring a good flight performance of two-piece golf balls. The multi-piece golf balls have a multi-layered structure selected from the following groups: one has a core consisting of multi-layers; one has a cover consisting of multi-layers; and one has one or more intermediate layers placed between the cover and the core. And each layer constituting the multi-piece golf ball has an appropriate hardness to obtain both of a good flight performance and shot feeling.

The multi-piece golf balls as disclosed in the above publications are roughly classified into three groups: ones in which the outermost layer of a cover is the hardest and a relatively soft layer is placed on the inside of the cover (e.g., 336617/1996); ones in which a softer intermediate layer than the core encloses the core (e.g., 336618/1996); and ones in which an intermediate layer enclosing the core is the hardest of all layers constituting of the golf ball (e.g., 266959/1997, 248351/1997).

There are, however, demands on further improvements in shot feeling and flying distance. Because the shot feeling depends on clubs. For example, when a hard cover is employed in order to increase the coefficient of restitution, the resultant golf ball provides a poor shot feeling upon use of a putter, although it is possible to reduce impact when hitting golf ball by a driver or an iron, Accordingly, it is a primary object of the present invention to provide a golf ball which offers excellent shot feeling with any kind of club, while retaining a high coefficient of restitution inherent in solid golf balls.

SUMMARY OF THE INVENTION

According to the present invention, a multi-piece golf ball comprises an inner core which is positioned in a central part of the golf ball and has a JIS-C hardness of 75 or smaller; an outer core which encloses the inner core; an outer cover which is positioned in a surface part of the golf ball ; and an inner cover which is placed on the inside of the outer cover and has a JIS-C hardness of 80 or larger. A JIS-C hardness of the outer core is smaller than that of the other components, and a JIS-C hardness of the outer cover is larger than that of the other components.

A multi-piece golf ball of the present invention further comprises an intermediate layer between the outer core and the inner cover.

These and other objects, features, aspects and advantages of the present invention will become more apparent from the following detailed description of the present invention when taken in conjunction with the accompanying drawings.

DETAILED DESCRIPTION OF THE INVENTION

A golf ball of the present invention has at least 4 components as follows:

an inner core which is positioned in a central part of the golf ball;

an outer core which encloses the inner core;

an outer cover which is positioned in a surface part of the golf ball;

and an inner cover which is placed on the inside of the outer cover.

Figure 1:
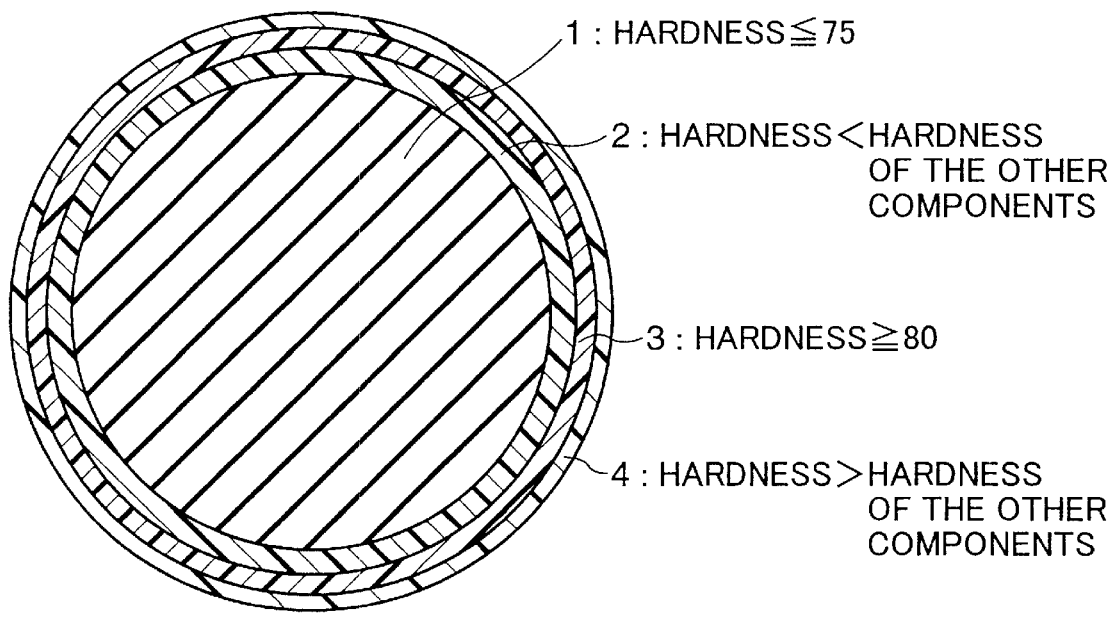
FIG. 1 is a cross sectional view of a four-piece golf ball according to one preferred embodiment of the present invention.

Its typical embodiment is a four-piece golf ball, as shown in FIG. 1, which comprises an inner core 1 positioned in a central part of the golf ball, an outer core 2 enclosing the inner core 1, an inner cover 3 enclosing the outer core 2 and an outer cover 4 enclosing the inner cover 3. According to the present invention, the inner core 1 has a JIS-C hardness of 75 or smaller, the outer core 2 has the smallest JIS-C hardness among components constituting the four-piece golf ball, the inner cover 3 has a JIS-C hardness of 80 or larger, and the outer cover 4 has the largest JIS-C hardness among components constituting the four-piece golf ball (inner core, outer core, inner cover and the outer cover). The term "JIS-C hardness" used herein is the hardness determined with a spring hardness tester C type according to JIS(Japanese Industrial Standard)-K6301. The JIS C hardness of the outer core is measured as the hardness at a surface of the outer core placed on the inner core. The JIS-C hardness of the inner cover is measured as the hardness at a surface of the inner cover placed on the outer core. The JIS C hardness of the outer cover is measured as the hardness at a surface of the outer cover, namely at a surface of the four-piece golf ball.

These components (inner core 1, outer core 2, inner cover 3, outer cover 4) will be described from the inside out.

The inner core 1 is usually made of vulcanized rubber having a JIS-C hardness of 75 or smaller, preferably 50 to 75. A preferable diameter of the inner core 1 is from 29 to 38 mm, in consideration of the standard size of golf balls.

The inner core 1 has a great influence on the shot feeling when the ball is hit by a driver or an iron having high head speed, because most of the four-piece golf ball is the inner core 1. Therefore, the inner core 1 is not soft enough to deform required, the ball is liable to spin and blows up in a wind ahead, resulting in impairing flying distance. For this reason, it is necessary for the inner core 1 to have a JIS-C hardness of 75 or smaller, preferably 70 or smaller. Further, in order to retain the shape of a solid golf ball and ensure its inherent high coefficient of restitution, it is desirable that the lower limit of the hardness of the inner core 1 is set to 50, preferably 55. The reason why the diameter of the inner core 1 is 29 mm or more is that, the golf ball having a diameter of below 29 mm may provide a lower trajectory angle and thus impair flying distance.

When a load ranging from 10 kg as an initial load to 130 kgf as a final load apply to the inner core 1, a preferable deformation amount of the inner core 1 is 4.0 mm or larger, more preferable deformation amount is 5.0 mm or larger. When the deformation amount of the core is smaller than 4.0 mm, the inner core 1 is too hard to give a good shot feeling by the club such as driver having high head speed. Furthermore, the golf ball is susceptible to spin, and may not attain a long flight distance. The preferable upper limitation of the deformation amount of the core is 6.0 mm, more preferably 5.5 mm, since a bigger deformation amount of the core causes the golf ball to decrease the resilience thereof.

The inner core 1 is generally made of a vulcanized rubber composition which comprises a base rubber, an organic peroxide as a crosslinking initiator, and an unsaturated carboxylic acid or its metal salt as a co-crosslinking agent.

As the base rubber used in a rubber composition for the inner core, there can be employed natural or synthetic diene rubbers used in cores of conventional solid golf balls. Examples of synthetic diene rubbers are ethylene-propylene-diene terpolymer (EPDM), butadiene rubber (BR), isoprene rubber (IR), styrene-butadiene rubber (SBR), and acrylonitrile-butadiene rubber (NBR). They can be used individually or in a combination with one another. Preferred is a cis-1,4-polybutadiene having cis-1.4-bonds of 40% or more, preferably 80% or more.

Examples of the organic peroxide include dicumyl peroxide, 1,1-bis(t-butyl peroxy)-3,5-trimethylcyclohexane, 2,5-dimethyl-2,5-di(t-butyl peroxy)hexane, and di-t-butyl peroxide. Preferred is dicumyl peroxide. The organic peroxide may be preferably used in the amount of 0.3 to 2.0 weight parts, more preferably 0.5 to 2.0 weight parts per 100 weight parts of the base rubber.

Examples of the unsaturated carboxylic acid or its metal salt include $\alpha,\beta$-unsaturated carboxylic acid having 3 to 8 carbon atoms, e.g., acrylic acid and methacrylic acid; and their univalent or bivalent metal salts, e.g., zinc acrylate, zinc methacrylate, magnesium acrylate or the like. Among them, zinc acrylate is preferred, because it can offer a higher coefficient of restitution. The metal salt of an $\alpha, \beta$-unsaturated carboxylic acid may be preferably used in the amount of 10 to 40 weight parts, more preferably 10 to 30 weight parts per 100 weight parts of the base rubber. When the amount of the metal salt is above 40 weight parts, crosslinked structure of the core is too dense to adjust the hardness of the inner core being 75 or less. When the amount of the metal salt is below 10 weight parts, the respectively high coefficient of restitution inherent in solid golf balls cannot be ensured.

The inner core composition may further contain conventional additives such as a weight adjuster, an antioxidant, a plasticizer, a dispersant, an ultraviolet absorber, a colorant, and a peptizer, if necessary.

Examples of the weight adjuster include an inorganic salt such as zinc oxide, barium sulfate and calcium carbonate; hyperbaric metal powder such as tungsten and molybdenum powder; and a mixture of these. Examples of the antioxidant include phenol based compounds.

Next, the outer core 2 will be described.

The outer core 2 is the softest component in ones constituting a multi-piece golf ball of the present invention, that is, a JIS-C hardness of the outer core 2 is smaller than the other components. The JIS-C hardness of the outer core 2 is preferably smaller than 50, more preferably 45 or smaller. The outer core 2 as well as the inner core 1 has a great influence on the shot feeling when hitting the golf ball by irons and drivers. Therefore, the soft outer core 2 can contribute to reducing the impact when hitting the ball. Furthermore, the outer core 2 is not required strictly to retain its spherical shape for retaining the ball shape, comparing with the inner core 1. Therefore, an appropriate balance between a thickness of the outer core 2 and a diameter of the inner core 1 can provide a multi-piece golf ball which has a restoring property and a cushioning property with exerting little influence on the coefficient of restitution. The restoring property is a property such that an original shape of a golf ball may be restored, even if the golf ball deforms greatly when hit by a driver and the cushioning property is a property such that impact given to players when hitting the ball is alleviated. A preferable outer core 2 has a thickness of about 0.5 to 2.0 mm. If the outer core 2 is too thick, a golf ball becomes too soft, thereby deforming greatly and hindering return to its original shape. To the contrary, if the outer core 2 is too thin, an improved shot feeling by the outer core 2 cannot be obtained. The lower limit of the hardness of the outer core 2 is preferably 30, more preferably 40. This is because when the outer core 2 having a sufficient thickness to improve a shot feeling, the resilience of the resultant golf ball is deteriorated. Therefore, a more preferable outer core 2 has a thickness of 0.5 to 2.0 mm and has a hardness of 30 to 50 exclusive.

As the material of the outer core 2, any materials satisfying the above-mentioned hardness may be used, for example, a vulcanized rubber, a thermoplastic elastomer, and a mixture thereof.

A rubber composition for the outer core 2 comprises a diene rubber as a base rubber, an organic peroxide as a crosslinking initiator, and an unsaturated carboxylic acid or its metal salt as a co-crosslinking agent. The rubber composition for outer core may further contain conventional additives such as a weight adjuster, an antioxidant, a plasticizer, a dispersant, an ultraviolet absorber, a colorant, and a peptizer, if necessary.

In order to achieve a hardness of less than 50, a preferable rubber composition contains polybutadiene as the base rubber, 0.5 to 2.0 weight parts of dicumyl peroxide and 5 to 20 weight parts of zinc acrylate per 100 weight parts of the base rubber.

The thermoplastic elastomer is a block copolymer formed by bonding a polymer block which shows a freeze phase or a crystalline phase at a melting point or lower, or a polymer block in which the movement of the molecules is restricted by hydrogen bonding (i.e. hard segment), and a polymer block in which the movement of the molecules is not restricted under the melting point (i.e. soft segment). Defining the hard segment as H and the soft segment as S, H and S may link in the form of H-S, H-S-H, or a multi-block form or a star-form expressed by $(H-S)_n$. Specific examples of the thermoplastic elastomer include: polystyrene elastomers in which the hard segment is polystyrene, and the soft segment is selected from the group of polybutadiene, polyisoprene and hydrogenated products thereof; polyolefin elastomers in which the hard segment is polyethylene or polypropyrene, and the soft segment is butyl rubber or ethylene-propyrene-diene terpolymer (EPDM); polyamide elastomers in which the hard segment is polyamide, and the soft segment is polyester or polyether; polyester elastomers in which the hard segment is polyester, and the soft segment is polyether; polyurethane elastomers in which the hard segment is a polyurethane block having urethane bonds, and the soft segment is polyester or polyether; elastomers in which polybutadiene block has epoxy groups, or elastomers in which polystyrene block has a hydroxyl group at the terminal thereof; and a mixture of two or more of these elastomers. In order to achieve the outer core hardness of less than 50, the polyurethane elastomers and polystyrene elastomers are preferably used.

An elastomer composition for outer core may further contain conventional additives such as a weight adjuster, an antioxidant, a plasticizer, a dispersant, an ultraviolet absorber, a colorant, and a peptizer, if necessary.

Next, the inner cover 3 will be described.

The inner cover 3 has a JIS-C hardness of 80 or larger, preferably 85 or larger. The upper limit of the inner cover 3 is preferably less than 100, more preferably 95, most preferably 90. The inner cover 3 having the hardness of 80 or more (preferably 80 to 100 exclusive) may contribute to giving a proper balance between a shot feeling and resilience of the resultant golf ball as the following reason. In order to increase the coefficient of restitution, higher hardness of an outer surface of the golf ball (i.e. outer cover hardness) is effective. However, as the outer cover 4 is harder, the player receives bigger impact when hitting the ball(i.e. poor shot feeling). Since the inner cover 3 has a sufficient hardness to decrease the impact while maintaining the resilience, the inner cover and the outer cover jointly can provide the ball having higher coefficient of restitution while maintaining a good shot feeling. In order to maintain high resilience inherent to the hard outer cover, the thickness of the inner cover 3 is preferably from 1.0 to 2.5 mm.

As the material of the inner cover 2, any materials satisfying the above-mentioned hardness may be used, for example, a vulcanized rubber, a thermoplastic elastomer, an ionomer ,and a mixture thereof.

A rubber composition for the inner cover comprises a diene rubber as a base rubber, an organic peroxide as a crosslinking initiator, and an unsaturated carboxylic acid or its metal salt as a co-crosslinking agent. A base rubber, an organic peroxide and an unsaturated carboxylic acid or its metal salt which described with respect to the material for the inner core composition may be used. In order to achieve the inner cover hardness of 80 or more, the preferable rubber composition contains polybutadiene as the base rubber, 0.5 to 2.0 weight parts of dicumyl peroxide and 10 to 40 weight parts of zinc acrylate per 100 weight parts of the base rubber.

As the thermoplastic elastomer for inner cover, thermoplastic elastomers exemplified as one for the outer core 2 may be used. In order to achieve the inner cover hardness of 80 or more, a hard elastomer such as polyamide elastomer is preferably used.

Ionomers are copolymers of an olefin and an α, β-unsaturated carboxylic acid with a portion of the carboxylic acid groups neutralized by a metal ion. In an ionomer for the inner cover, monovalent metal such as sodium, potassium and lithium; bivalent metal such as zinc, calcium, magnesium, copper and manganese; and trivalent metal such as aluminum and neodymium are preferable used. More preferred are sodium, lithium and magnesium because they provide hard ionomers having high hardness and high coefficient of restitution. But it is not limited thereto.

As a material for inner cover, an ionomer composition mainly composed of ionomer is preferred. Because the above-mentioned ionomers are effective to obtain an inner cover having a hardness of 80 or more, preferably 85 or more.

Next, the outer cover 4 will be described.

The outer cover 4 has the largest JIS-C hardness of the components constituting the golf ball of the present invention, that is, a JIS-C hardness of the outer cover 4 is larger than that of the other components. Specifically, an outer cover hardness is 90 or larger, preferably 94 or larger. Because a harder outer surface of a golf ball can lead the golf ball with a higher coefficient of restitution, thereby obtain a longer flying distance. The preferable upper limitation of the outer cover hardness is 100, more preferably 98. The hardness of the outer cover 4 is more than 100, the shot feeling become worse due to the hard outer cover. The preferable thickness of the outer cover 4 is in the range of 1.0 to 2.5 mm. When the thickness is smaller than 1 mm, the resultant golf ball may not provide a sufficient resilience to ensure longer flying distance. On the other hand, when the thickness is more than 2.5 mm, the influence of the outer cover 4 on the shot feeling is not ignored, and the resultant golf ball gives a poor shot feeling.

As the material of the outer cover 4, any materials satisfying the above-mentioned requirements may be used. For example, a balata and an ionomer may be used. Preferred is an ionomer, because it is superior to balata in durability. Ionomers exemplified as one for inner cover may be used for the outer cover. Preferred is an ionomer in which zinc is adopted for neutralizing copolymer, since zinc ion may contribute to forming aggregates to maintain high strength of the ionomeric outer cover.

The outer cover composition mainly composed of ionomer further contains additives such as a colorant, an antioxidant, a plasticizer, a dispersant and an ultraviolet absorbent, if necessary.

Figure 2:
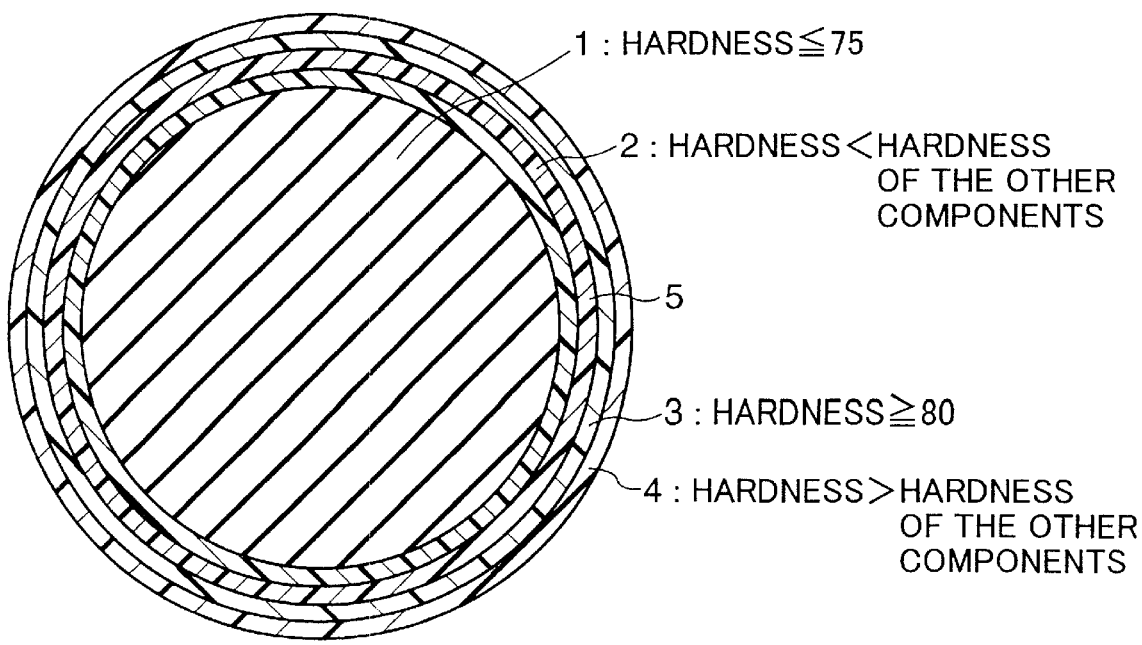
FIG. 2 is a cross sectional view of a five-piece golf ball according to other preferred embodiment of the present invention.

Another embodiment of the multi-piece golf ball of the present invention is five-piece golf ball shown in FIG. 2. The five piece golf ball include an intermediate layer 5 between the outer core 2 and the inner cover 3, besides essential four components (i.e. inner core 1, outer core 2, inner cover 3 and outer cover 4). Multi-piece golf balls having two or more intermediate layers are included in multi-piece golf balls of the present invention.

According to the present invention, the thickness of components interposed between the inner core 1 and outer cover 4 (i.e. the sum of thickness of the outer core 2 and the inner cover 3 in the case of four-piece golf balls, and, when one or more intermediate layers is included, the thickness of the intermediate layers should be added to the above sum) is preferably from 1.5 to 4.5 mm, more preferably 2.0 to 4.0 mm, considering the diameter of the inner core 1 and the thickness of the outer cover 4. The overall JIS-C hardness of components interposed between the inner core 1 and the outer cover 4 is preferably from 50 to 100 exclusive. That is, the outer core 2, the intermediate layer 5 and the inner cover 3 have a JIS-C hardness of 50 to 100 exclusive, as a whole.

In producing a four-piece golf ball of the present invention, the inner core 1 is produced first, and the inner core 1 is covered with the outer core 2, the inner cover 3 and the cover 4 in this order. When producing a golf ball included an intermediate layer 5 between the outer core 2 and the inner cover 3, production of the intermediate layer 5 is executed after the production of the outer core 2 and before covering with the inner cover 3.

The inner core 1 is formed by vulcanization in a mold under heat and pressure. The outer core 2, the inner cover 3 and the outer cover 4 are formed by a conventional method for forming golf ball cover well known in the art, such as injection molding, compression molding and the like. In the compression molding, two preformed half-shells are prepared, and the molded center is put into one of them, and then the half-shells are combined together into a shape of ball.

In forming an outer cover, dimples or brambles are impressed onto the surface of the outer cover. After outer cover forming, paint finishing and mark stamping may be provided on the surface for serving commercial sale.

In the four-piece golf balls of the present invention, the hardness of all components constituting the multi-piece golf ball are determined in consideration of the relationship between each other in order to obtain a good balance between shot feeling and flight performance. Therefore, by use of a multi-piece golf ball of the present invention, players may obtain a long flying distance while receiving less impact.

EXAMPLES

[Evaluation Methods]

(1) Trajectory Angle (°), spin rate (rpm), and flying distance (m)

A W#1 driver with a metal head was mounted to a swing robot manufactured by True Temper Co., Ltd., and a golf ball was hit at head speed of 40 m/sec. Immediately after hitting, the trajectory angle and the rate of back spin were measured. The distance from the point where the ball was hit to the point where the ball to the ground was measured as flying distance (i.e. carry). These measurements were conducted five times and the respective average values were obtained.

(2) Shot Feeling

Each of ten professional golfers hit the golf ball using a W#1 driver having a metal head, and judged their shot feeling according to the following criteria. Of ten evaluations, the commonest one was adopted as the shot feeling of the ball.

⊚: the impact was very small (very soft feel);

○: the impact was small (soft feel);

Δ: the impact was not small (rather hard feel); and

X: the impact was very large (hard feel).

(3) deformation amount(mm)

A load ranging from 10 kgf as an initial load to 130 kgf as a final load was applied to the inner core, and a deformation amount of the inner core was measured.

(4) JIS-C hardness

A JIS-C hardness is measured according to JIS K6301. A JIS-C hardness of an inner core is a value measured a surface of the inner core. A JIS-C hardness of an outer core is a value measured a surface of the outer core enclosing the inner core. A JIS-C hardness of a inner cover is a value measured a surface of the inner cover enclosing the outer core, in case of four-piece golf balls. In case of multi-piece golf balls which includes an intermediate layer between an outer core and an inner cover, a JIS-C hardness of the inner cover is a value measured a surface of the inner cover enclosing the intermediate layer. A JIS-C hardness of an outer cover is a value measured a surface of the golf ball.

[Preparation of Golf Balls]

Each of the rubber compositions for inner core as indicated in Table 1 was kneaded uniformly by a kneading roll. This was firstly subjected to press molding at 140° C. for 25 minutes, and then at 165° C. for 8 minutes, to form spherical solid inner cores having a diameter of 31.9 mm, 33.1 mm and 35.3 mm. Subsequently, acomposition for outer core enclosed the surface of the inner core by injection molding, to form an outer core. Thereafter, an inner cover and an outer cover are formed in this order by injection molding, to form a four-piece golf ball having a diameter of 42.7 mm. Thickness of the outer core, the inner cover and the outer cover are indicated in Table 2. A surface of the outer cover of the produced four-piece golf ball was painted, resulting in golf balls Nos. 1 to 7. Trajectory angle, spin rate, flying distance, and shot feeling of the respective golf balls were measured by the methods described above. The results of measurements are shown in Tabel 2.

TABLE 1

| | Golf ball No. | | | | | | |
|---|---|---|---|---|---|---|---|
| | 1 | 2 | 3 | 4 | 5 | 6 | 7 |
| Inner Core | | | | | | | |
| BR11 | 100 | 100 | 100 | 100 | 100 | 100 | 100 |
| Zinc Acrylate | 21 | 20 | 22 | 22 | 23.5 | 27.5 | 25.5 |
| Zinc oxide | 33.9 | 34.2 | 33.6 | 33.6 | 33.1 | 31.9 | 20.1 |
| Antioxidant | 0.5 | 0.5 | 0.5 | 0.5 | 0.5 | 0.5 | 0.5 |
| Dicumyl peroxide | 2 | 2 | 2 | 2 | 2 | 2 | 2 |
| DPDS | 0.5 | 0.5 | 0.5 | 0.5 | 0.5 | 0.5 | 0.5 |
| Outer Core | | | | | | | |
| Elastoran ET880 | 100 | 100 | 100 | — | 100 | — | 100 |
| Elastoran ET890 | — | — | — | — | — | 100 | — |
| Cepton HG252 | — | — | — | 100 | — | — | — |
| Tungsten | 15.7 | 15.7 | 15.7 | 34.2 | 15.7 | 15.7 | 15.7 |
| Inner cover | | | | | | | |
| Himilan 1555 | 30 | — | — | — | 30 | — | — |
| Himilan 1706 | 30 | — | — | — | 30 | — | — |
| Himilan 1855 | — | — | 20 | 30 | — | 10 | — |
| Surlyn 9945 | — | 20 | 32 | 25 | — | 37 | — |
| Surlyn 8945 | — | 22 | 30 | 27 | — | 46 | — |
| Surlyn AD8542 | 20 | 40 | — | — | 20 | — | — |
| Pebax 2533S | 12 | 10 | 10 | 10 | 12 | 5 | — |
| A1010 | 8 | 8 | 8 | 8 | 8 | 2 | — |
| Outer Cover | | | | | | | |
| Himilan 1605 | 46 | 46 | 46 | — | 46 | — | 40 |
| Himilan 1706 | 30 | 30 | 30 | — | 30 | — | 30 |
| Himilan 1707 | — | — | — | — | — | — | 30 |
| Himilan 1855 | 10 | 10 | 10 | 10 | 10 | 10 | — |
| Surlyn 9945 | — | — | — | 37 | — | 37 | — |
| Surlyn 8945 | — | — | — | 46 | — | 46 | — |
| Pebax 2533S | 10 | 10 | 10 | 5 | 10 | 5 | — |
| A1010 | 4 | 4 | 4 | 2 | 4 | 2 | — |

As a base rubber for an inner core, BR11 (cis-1,4-polybutadiene having 96 % of cis-1,4 bonds, a product of JSR Co., Ltd.) was used. In Tables 1, the term "DPDS" means diphenyl disulfide, a product of Sumitomo Seika Co., Ltd. "Elastoran ET880" and "Elastoran ET890" are polyurethane thermoplastic elastomers which differ from each other in hardness, manufactured by Takeda Badische Urethane Industries Co., Ltd. "Septon HG252" is a styrene thermoplastic elastomer manufactured by Kuraray Co., Ltd. "Himilan 1555", "Himilan 1605" and "Himilan 1707" are the product name of an ionomer resin of ethylene-methacrylic acid copolymer neutralized by sodium ion, and "Himilan 1706" and "Himilan 1855" are the product name of an ionomer resin of ethylene-methacrylic acid copolymer neutralized by zinc ion, manufactured by Mitsui DuPont Polychemical Co., Ltd. "Surlyn 894511" is the product name of an ionomer resin of ethylene-methacrylic acid copolymer neutralized by sodium ion, "Surlyn 9945" is the product name of an ionomer resin of ethylene-methacrylic acid copolymer neutralized by zinc ion, "Surlyn AD8542" is the product name of an ionomer resin of ethylene-methacrylic acid copolymer neutralized by magnesium ion, those are manufactured by DuPont Co., Ltd. "Pebax 2533S" is a thermoplastic polyamide elastomer manufactured by Toray Industries Inc. "A1010" is a block copolymer manufactured by Daicel Chemical Industries, Ltd., which comprises polystyrene block (referred as "S") as a hard segment and polybutadiene block having epoxy group(referred as "B") as a soft segment and these blocks are linked in the form of S-B-S.

TABLE 2

| | Golf ball No. | | | | | | |
|---|---|---|---|---|---|---|---|
| | 1 | 2 | 3 | 4 | 5 | 6 | 7 |
| Inner Core | | | | | | | |
| Diameter | 31.9 | 31.9 | 31.9 | 31.9 | 33.1 | 31.9 | 35.3 |
| Hardness | 66 | 65 | 68 | 68 | 69 | 78 | 75 |
| Deformation amount | 5.09 | 5.22 | 4.83 | 4.83 | 4.70 | 3.52 | 3.91 |
| Outer Core | | | | | | | |
| Thickness | 1.6 | 1.6 | 1.6 | 1.6 | 1.6 | 1.6 | 1.6 |
| Hardness | 48 | 47 | 49 | 42 | 49 | 62 | 55 |
| Inner Cover | | | | | | | |
| Thickness | 1.9 | 1.9 | 1.9 | 1.9 | 1.6 | 1.9 | — |
| Hardness | 87 | 85 | 90 | 89 | 87 | 97 | — |
| Outer Cover | | | | | | | |
| Thickness | 1.9 | 1.9 | 1.9 | 1.9 | 1.6 | 1.9 | 2.1 |
| Hardness | 94 | 94 | 94 | 97 | 94 | 97 | 99 |
| Evaluation | | | | | | | |
| Trajectory Angle | 13.3 | 13.4 | 13.1 | 13.2 | 13.6 | 12.1 | 12.8 |
| Spin | 2500 | 2480 | 2560 | 2530 | 2500 | 2900 | 2630 |
| Flying distance | 186.6 | 186.4 | 186.1 | 186.3 | 186.5 | 184.5 | 185.5 |
| Shot Feeling | ⊚ | ⊚ | ○ | ○ | ○ | x | Δ |

As can be seen in Table 2, golf balls Nos. 1 to 5 satisfied requirements of the present invention (inner core hardness of 75 or less, inner cover hardness is the smallest, the outer core hardness is the smallest and the outer cover hardness is the largest among components constituting four-piece golf ball), and exhibited excellent properties: trajectory angles of Nos. 1 to 5 are more than 13.1° (relatively high angle), spin rates of these are 2560 or smaller, flying distances (i.e. carry) are longer than 186 m (satisfying flying distance), and shot feelings of these show satisfactory results. With respect to shot feeling, especially, golf balls Nos. 1 and 2 in which the inner core deformation amounts are more than 5.0 mm are superior to golf balls Nos. 3 to 5.

Golf ball No. 6 included the inner core having a hardness of larger than 75 and inner cover having the same hardness ad the outer cover hardness (i.e. 97), therefore No. 6 exhibited inferior properties to golf balls Nos. 1 to 5: the trajectory angle is smaller, spin rate is larger, flying distance is 184.5 m (shorter than that of Nos. 1 to 5) and shot feeling is bad. Golf ball No. 7 is classified into three-piece golf balls without the inner cover. No. 7 was satisfied requirements for the inner core (hardness of 75) and outer cover (having largest hardness among components constituting three-piece golf ball), however No. 7 is inferior to Nos. 1 to 5 in shot feeling, trajectory angle and flying distance.

While the present invention has been shown and described in detail, the foregoing description is in all aspects illustrative and not restrictive. It is therefore understood that numerous modifications and variations can be devised without departing from the scope of the present invention.

What is claimed is:

1. A multi-piece golf ball comprising:
    an inner core which is positioned in a central part of the golf ball, and has a JIS-C hardness of 50 to 70; and the inner core has a diameter from 29 mm to 38 mm;
    an outer core which encloses the inner core; and the outer core has a thickness from 0.5 mm to 2.0 mm;
    an outer cover which is positioned in a surface part of the golf ball; and
    an inner cover which is placed on the inside of the outer cover, and has a JIS-C hardness of 80 or larger, wherein the JIS-C hardness of the outer core is less than 50 and smaller than that of the other components, and a JIS-C hardness of the outer cover is larger than that of the other components.

2. A multi-piece golf ball according to claim 1, wherein the inner core deforms 4.0 mm or larger when applying a load from 10 kgf as an initial load to 130 kgf as a final load thereto.

3. A multi-piece golf ball according to claim 1, wherein the inner core deforms in the range of 4.0 mm to 6.0 mm when applying a load from 10 kgf as an initial load to 130 kgf as a final load thereto.

4. A multi-piece golf ball according to claim 1, wherein the inner core has a diameter of 29 mm to 38 mm, the outer core has a thickness of 0.5 mm to 2.0 mm, the inner cover has a thickness of 1.0 mm to 2.5 mm, and the outer cover has a thickness of 1.0 mm to 2.5 mm.

5. A multi-piece golf ball according to claim 1, wherein the inner core has a JIS-C hardness of 50 to 75.

6. A multi-piece golf ball according to claim 1, wherein the outer core has a JIS-C hardness of 30 to 50 exclusive.

7. A multi-piece golf ball according to claim 1, wherein the inner cover has a JIS-C hardness of 80 to 100 exclusive.

8. A multi-piece golf ball according to claim 7, wherein the inner cover has a JIS-C hardness of 85 to 95.

9. A multi-piece golf ball according to claim 1, wherein the outer cover has a JIS-C hardness of 90 or larger.

10. A multi-piece golf ball according to claim 8, wherein the outer cover has a JIS-C hardness of 90 to 100.

11. A multi-piece golf ball according to claim 1, further comprising an intermediate layer between the outer core and the inner cover, the sum of thickness of the outer core, the intermediate layer and the inner cover being from 4.35 mm to 5.85 mm.

12. A multi-piece golf ball according to claim 11, wherein the outer core, the intermediate layer and the inner cover have a JIS-C hardness of 50 to 100 exclusive, as a whole.

13. A multi-piece golf ball according to claim 1, wherein the inner core comprises a vulcanized rubber composition containing a base rubber, an organic peroxide, and an unsaturated carboxylic acid or metal salt thereof, the outer core comprises a thermoplastic elastomer, the inner cover comprises a mixture of an ionomer resin and a thermoplastic elastomer, and the outer cover comprises a mixture of an ionomer resin and a thermoplastic elastomer.

* * * * *